United States Patent
Rademacher et al.

(10) Patent No.: US 9,546,237 B2
(45) Date of Patent: Jan. 17, 2017

(54) STABILIZATION OF POLYMERS THAT CONTAIN A HYDROLYZABLE FUNCTIONALITY

(71) Applicant: BRIDGESTONE CORPORATION, Chuo-Ku (JP)

(72) Inventors: Christine M. Rademacher, Akron, OH (US); Terrence E. Hogan, Uniontown, OH (US); Jessica C. Kurasch, Fairlawn, OH (US)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 13/911,503

(22) Filed: Jun. 6, 2013

(65) Prior Publication Data
US 2013/0331520 A1 Dec. 12, 2013

Related U.S. Application Data

(60) Provisional application No. 61/656,128, filed on Jun. 6, 2012.

(51) Int. Cl.
| | |
|---|---|
| *C08F 236/06* | (2006.01) |
| *B60C 1/00* | (2006.01) |
| *C08C 19/30* | (2006.01) |
| *C08C 19/44* | (2006.01) |

(52) U.S. Cl.
CPC .............. *C08F 236/06* (2013.01); *B60C 1/00* (2013.01); *B60C 1/0016* (2013.04); *B60C 1/0025* (2013.04); *C08C 19/30* (2013.01); *C08C 19/44* (2013.01)

(58) Field of Classification Search
USPC ........................................................ 525/102
See application file for complete search history.

(56) References Cited

U.S. PATENT DOCUMENTS

| | | | |
|---|---|---|---|
| 4,837,274 A * | 6/1989 | Kawakubo et al. ......... | 525/100 |
| 5,659,056 A | 8/1997 | Hergenrother et al. | |
| 6,008,295 A * | 12/1999 | Takeichi ............... | B60C 1/0016 |
| | | | 524/423 |
| 6,255,404 B1 | 7/2001 | Hogan et al. | |
| 6,279,632 B1 | 8/2001 | Hogan et al. | |
| 2005/0009979 A1 | 1/2005 | Tanaka et al. | |
| 2010/0113683 A1 | 5/2010 | Matsumoto et al. | |
| 2011/0092633 A1 | 4/2011 | Nukaga | |

* cited by examiner

*Primary Examiner* — Kuo-Liang Peng
(74) *Attorney, Agent, or Firm* — Meredith E. Hooker; Arthur M. Reginelli

(57) ABSTRACT

A process for treating a polymer having a hydrolyzable functionality, the process comprising:
(i.) providing a polymer having hydrolyzable functionality;
(ii.) introducing an alkoxysilane to the polymer, where the alkoxysilane is defined by the formula I

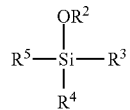

where $R^2$ is a hydrocarbyl group, $R^3$, $R^4$, and $R^5$ are each independently a hydrocarbyl group or a hydrocarbyloxy group; and
(iii.) introducing a silane having a hydrolyzable functionality, where the silane is defined by the formula II

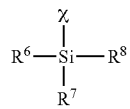

where $\chi$ is a hydrolyzable group that forms an acidic species upon hydrolysis, where $R^6$, $R^7$, and $R^8$ are each independently a halogen atom, a hydrocarbyl group, a hydrocarboxylate group, or a hydrocarbyloxy group.

17 Claims, No Drawings

STABILIZATION OF POLYMERS THAT CONTAIN A HYDROLYZABLE FUNCTIONALITY

This application claims the benefit of U.S. Provisional Application Ser. No. 61/656,128, filed Jun. 6, 2012, which is incorporated herein by reference.

FIELD OF THE INVENTION

Embodiments of the present invention are directed toward methods for treating polymers that contain a hydrolyzable functionality. The method includes first treating the polymer with an alkoxysilane and then subsequently treating the polymer with a silane including a hydrolyzable group that forms an acidic species upon hydrolysis.

BACKGROUND OF THE INVENTION

It is common in the rubber industry, such as the tire industry, to reinforce rubber compositions with particulate filler. Among the advantages of doing so, the particulate filler can bolster the modulus of the rubber composition. For example, silica has advantageously been employed as a filler. The use of silica filler within tire treads produces, among other advantages, improved wear.

While fillers offer advantages in rubber compositions, the presence of the filler impacts the dynamic properties of the rubber compositions. Namely, hysteretic loss increases with filler concentration. This can be disadvantageous, especially in tire treads, because hysteretic loss is inversely proportional to rolling resistance.

It is known that polymers can be modified with certain functionalities that react or interact with filler and thereby reduce hysteretic loss. This reaction or interaction between the polymer functionality and the filler particle is believed to reduce polymer loose ends and disassociate filler agglomerates. For example, it is known to functionalize polymer chains with silicon-containing functionalities that react or interact with, or can be hydrolyzed to form functionalities that react or interact with, the silica filler. While these functionalities have proven useful in reducing hysteretic loss, the presence of these functionalities can present processing issues. Namely, the functionalities can serve as a location to couple polymer chains and thereby produce a Mooney growth or a Mooney viscosity jump.

Attempts have been made to alleviate this Mooney growth. For example, U.S. Pat. No. 5,659,056 teaches the addition of a stabilizing agent that does not react with the polymer functionality but instead serves to neutralize the bi-product lithium compounds that may be present from polymer initiators. At neutral pH, the Mooney viscosity jump is less severe. Alternatively, U.S. Pat. No. 6,279,632 teaches a method for stabilizing Mooney viscosity growth by treating these polymers with long-chain alcohols. And, U.S. Pat. No. 6,255,404 teaches a method for stabilizing Mooney viscosity growth by treating polymers with silicon-containing functionalities with alkyl alkoxysilanes.

While the foregoing approaches have been useful, the silicon-containing functionalities on many useful polymers have a very high affinity to undergo hydrolysis reactions with water (i.e. hydrolyze), and therefore there is a need to develop a more aggressive means to stabilize the polymers from Mooney viscosity growth.

SUMMARY OF THE INVENTION

Embodiments of the present invention include a [to be inserted].

A process for treating a polymer having a hydrolyzable functionality, the process comprising: providing a polymer having hydrolyzable functionality; introducing an alkoxysilane to the polymer, where the alkoxysilane is defined by the formula I

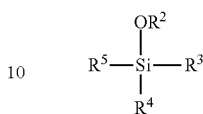

where $R^2$ is a hydrocarbyl group, $R^3$, $R^4$, and $R^5$ are each independently a hydrocarbyl group or a hydrocarbyloxy group; and introducing a silane having a hydrolyzable functionality, where the silane is defined by the formula II

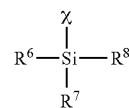

where $\chi$ is a hydrolyzable group that forms an acidic species upon hydrolysis, where $R^6$, $R^7$, and $R^8$ are each independently a halogen atom, a hydrocarbyl group, a hydrocarboxylate group, or a hydrocarbyloxy group.

Embodiments of the present invention include a [to be inserted].

DETAILED DESCRIPTION OF ILLUSTRATIVE EMBODIMENTS

Embodiments of the invention are based, at least in part, on the discovery of a method for stabilizing polymers having hydrolyzable end groups that are susceptible to condensation coupling. The methods of one or more embodiments include treatment of a polymer with an alkoxysilane followed by treatment with a silane having a hydrolyzable group that forms an acidic species upon hydrolysis. The methods of the invention are particularly useful for treating polymers having hydrolyzable end groups as well as a basic functionality or substituent at or near the hydrolyzable end group. Thus, while the prior art contemplates the treatment of polymers having a hydrolyzable functionality with alkoxysilane compounds, embodiments of the present invention achieve unexpected results by further treating the polymer with a silane having a hydrolyzable group that forms an acidic species upon hydrolysis. Included among the benefits is the reduced amount of alkoxysilane required to achieve technologically useful results.

Polymers to be Stabilized

In one or more embodiments, polymers stabilized by practice of the present invention include polymers having one or more hydrolyzable functionalities. In one or more embodiments, hydrolyzable functionalities, which may also be referred to as hydrolyzable groups, include those groups or substituents that are relatively stable, and therefore remain chemically bonded to their base atom or parent atom, in non-aqueous environments or environments that are devoid or substantially devoid of water. However, once exposed to water, moisture, or materials containing water or moisture, the hydrolyzable groups or substituents hydrolyze and are thereby cleaved from their base atom or parent atom. In one or more embodiments, hydrolyzable functionalities may include, for example, a hydrocarbyloxy group (i.e.

—OR), hydrocarbyl amino group (i.e. —NR$_2$), thiohydrocarbyloxy group (i.e. —SR), hydrocarbylphosphinyl group (i.e. —PR$_2$), hydrocarbylcarboxyl group (i.e. —OC(O)R), or hydroxyl group (—OH), where R refers to a monovalent organic group, bonded to a silicon atom, or similar group 14 atom. In one or more embodiments, the hydrolyzable functionality includes a hydrocarbyloxy group bonded to a silicon atom (i.e. an alkoxysilane group).

In one or more embodiments, monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. Substituted hydrocarbyl groups include hydrocarbylene groups in which one or more hydrogen atoms have been replaced by a substituent such as an alkyl group. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, these polymers may be defined by the formula $$\pi\text{—}\delta$$

where $\pi$ is a polymer chain and $\delta$ is a hydrolyzable functionality.

In one or more embodiments, hydrolyzable functionalities, which may also be referred to hydrolyzable groups, include those groups that react with water, via a hydrolysis reaction, and thereby convert the group to a more reactive group (e.g., Si—OR converts to Si—OH) that self react and thereby lead to undesirable coupling.

The polymer chain ($\pi$), which may also be referred to as the polymer backbone, may be unsaturated. In these or other embodiments, the polymer chain is vulcanizable. In particular embodiments, the polymer chain ($\pi$) includes a functional group at an opposite terminal end and therefore the polymer may be difunctional or multifunctional.

The polymer chains can have a glass transition temperature ($T_g$) that is less than 0° C., in other embodiments less than –20° C., and in other embodiments less than –30° C. In one embodiment, the polymer chain may exhibit a single glass transition temperature.

In one or more embodiments, the number average molecular weight ($M_n$) of the polymer chain may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

In one or more embodiments, the polymer chain ($\pi$) may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In one or more embodiments, the polymer backbone ($\pi$) may be cis-1,4-polydienes having a cis-1,4-linkage content (which may be referred to as mer content) that is greater than 60%, in other embodiments greater than about 75%, in other embodiments greater than about 90%, and in other embodiments greater than about 95%. Also, these polymers may have a 1,2-linkage content that is less than about 7%, in other embodiments less than 5%, in other embodiments less than 2%, and in other embodiments less than 1%. The cis-1,4- and 1,2-linkage contents can be determined by infrared spectroscopy. The number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The polydispersity ($M_w/M_n$) of these polymers may be from about 1.5 to about 5.0, and in other embodiments from about 2.0 to about 4.0.

In particular embodiments, the polymer chain ($\pi$) may be a copolymer of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In particular embodiments, the polymer chain ($\pi$) is a copolymer of styrene and one or more conjugated dienes. The ratio of styrene mer units to conjugated diene mer units may be from about 0.05:1 to about 1.1:1, in other embodiments from about 0.1:1 to about 1:1, and in other embodiments from about 0.5:1 to about 0.8:1.

In one or more embodiments, the polymer chain ($\pi$) is an anionically-polymerized polymer selected from the group consisting of polybutadiene, polyisoprene, poly(styrene-co-butadiene), poly(styrene-co-butadiene-co-isoprene), poly(isoprene-co-styrene), and poly(butadiene-co-isoprene).

In particular embodiments, the polymers containing a hydrolyzable group that are treated according to the present invention include polymers having a hydrocarbyloxysilyl group (i.e. —SiOR). These particular polymers may be referred to as siloxane-terminated polymers.

In particular embodiments, polymers containing a hydrolcarbyloxysilyl group may be represented by the formula $$\pi\text{—Si}(R^{11})_{3-y}(OR^{12})_y$$

where $\pi$ is defined as above, each $R^{11}$ is independently a monovalent organic group, each $R^{12}$ is independently a monovalent organic group, and y is an integer from 1 to 3. Practice of the present invention has advantageously been found to be particularly useful in stabilizing and neutralizing those polymers where $R^{11}$ includes a heteroatom that impacts, such as through catalytic affect, the hydrolysis or condensation of the alkoxy groups. Thus, in certain embodiments, the $R^{11}$ includes a heteroatom functionality such as, but not limited to, an amine functionality or an imino functionality.

Preparation of Polymers to be Stabilized

In one or more embodiments, the polymers that are treated according to the present invention and that include a hydrolyzable functionality may be prepared by anionic polymerization. The hydrolyzable functionality may be imparted to the polymer by employing an initiator that imparts a functional group at the head of the polymer, or a functional terminator that imparts a functional group at the tail-end of the polymer, or both. In one or more embodiments, the preparation of the polymers to be treated according to the present invention includes at least the step of initiating the polymerization by using an initiator that will impart a hydrolyzable group to the head of the polymer or at least the step of terminating the polymerization by using a terminating agent that will impart a hydrolyzable group to the tail of the polymer.

The monomer that can be anionically polymerized to form these polymers include conjugated diene monomer, which may optionally be copolymerized with other monomers such as vinyl-substituted aromatic monomer. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinylnaphthalene. When preparing copolymers, such as those containing conjugated diene monomers and vinyl-substituted aromatic (e.g., polydiene copolymers) monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

The preparation of polymers by employing anionic polymerization techniques is generally known. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce reactive polymers (e.g. living polymers) that, prior to quenching, are capable of reacting with additional monomers for further chain growth or reacting with certain functionalizing agents to give functionalized polymers. As those skilled in the art appreciate, these reactive polymers include a reactive chain end, which is believed to be ionic, at which a reaction between a functionalizing agent and the tail end of the polymer can take place and thereby impart a functionality to the tail end of the polymer. Also, anionic polymerization techniques allow for the use of initiators containing a functionality that can be imparted to the head of the polymer.

The practice of this invention is not limited by the selection of any particular anionic initiators. In particular embodiments, the hydrolyzable functionality or group is imparted to the polymer by either the initiator or the functionalizing agent. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black filled vulcanizates prepared from polymers containing the functional group as compared to similar carbon-black filled vulcanizates prepared from polymer that does not include the functional group.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium compounds, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference. Additional examples include cyclic sulfur-containing or oxygen containing azaheterocycles such as disclosed in WO 2004/020475, U.S. Ser. No. 60/644,164 and U.S. Pat. No. 6,596,798, which are incorporated herein by reference. Other examples include boron-containing terminators such as disclosed in U.S. Ser. No. 60/591,065, which is incorporated herein by reference. Still other examples include cyclic siloxanes such as hexamethylcyclotrisiloxane, including those disclosed in copending U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in copending U.S. Ser. Nos. 60/624,347 and 60/643,653, which are incorporated herein by reference. In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference. In yet other embodiments, the head of the polymer is functionalized by initiating polymerization in the presence of a vinyl silane or vinyl silazane and an organolithium compound. These particular polymers may be referred to as silazane-intitiated polymers. Techniques for preparing silazane-initiated polymers are set forth in U.S. Publication Nos 2010/0056713, 2010/0056712, 2010/0056711, 2010/0056710, 2010/0056709, 2010/0056703, 2010/0016499, 2009/0247696, and 2009/0247692, which are incorporated herein by reference. In general, mono-, di, and tri-silazanes can be reacted with an alkyllithium, either in a preformation set or in situ, to form an initiator species.

Anionic polymerization may be conducted in polar solvents, non-polar solvents, and mixtures thereof. In one or more embodiments, a solvent may be employed as a carrier to either dissolve or suspend the initiator in order to facilitate the delivery of the initiator to the polymerization system. In other embodiments, monomer can be used as the carrier. In yet other embodiments, the initiator can be used in their neat state without any solvent. In one or more embodiments, the solvent content of the polymerization mixture may be more than 20% by weight, in other embodiments more than 50% by weight, and in still other embodiments more than 80% by weight based on the total weight of the polymerization mixture.

In one or more embodiments, the polymerization reactions, as well as the stabilization of the polymers, takes place within a solvent. In one or more embodiments, the solvent may be employed to either dissolve or suspend one or more of the monomer, polymer, and/or stabilizing agents. Suitable solvents include those organic compounds that will not undergo polymerization or incorporation into a propagating polymer chain during polymerization of monomer. In one or more embodiments, these organic solvents are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. The low-boiling hydrocarbon solvents are typically separated from the polymer upon completion of the polymerization. Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer. In yet other embodiments, examples of useful organic solvents include non-Zerwittenoff polar organic solvents. These solvents include, but are not limited to, ethers, such as dimethyl ether and diethyl ether, as well as cyclic ethers, such as tetrahydrofuran (THF) and 2,2-bis(2'-tetrahydrofuryl)propane. Other non-Zerwittenoff polar organic solvents include tertiary amines such as tri-n-butyl amine.

Anionic polymerization may be conducted in the presence of a randomizer or vinyl modifier. As those skilled in the art appreciate, these compounds, which may serve a dual role, can assist in the randomizing comonomer throughout the polymer chain and/or modify the vinyl content of the mer units deriving from dienes. Compounds useful as randomizers include those having an oxygen or nitrogen heteroatom and a non-bonded pair of electrons. Examples include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N-N'-dimethylpiperazine, diazabicyclooctane, dimethyl ether, diethyl ether, tri-n-butylamine, and mixtures thereof. In other embodiments, potassium alkoxides can be used to randomize the styrene distribution.

The amount of randomizer to be employed may depend on various factors such as the desired microstructure of the polymer, the ratio of monomer to comonomer, the polymerization temperature, as well as the nature of the specific randomizer employed. In one or more embodiments, the amount of randomizer employed may range between 0.01 and 100 moles per mole of the anionic initiator.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

Polymerization of conjugated diene monomer, optionally together with monomer copolymerizable with conjugated diene monomer, in the presence of an effective amount of initiator, produces a reactive polymer. The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In one or more embodiments, the amount of initiator employed may be expressed as the mmols of initiator per weight of monomer. In one or more embodiments, the initiator loading may be varied from about 0.05 to about 100 mmol, in other embodiments from about 0.1 to about 50 mmol, and in still other embodiments from about 0.2 to about 5 mmol of initiator per 100 gram of monomer.

In other embodiments, the polymers that are treated according to the present invention and that include a hydrolyzable functionality may be prepared by coordination catalysis. The hydrolyzable functionality can be imparted to the polymer by employing an a functional terminator that imparts a functional group at the tail-end of the polymer via a reaction with a reactive end of an active or reactive polymer. In one or more embodiments, the reactive polymer is prepared by coordination polymerization, wherein conjugated diene monomer is polymerized by using a coordination catalyst system. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics*

2003, volume 204, pages 289-327). Coordination catalysts are believed to initiate the polymerization of monomer by a mechanism that involves the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via π-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide-containing compound), an alkylating agent (e.g., an organoaluminum compound), and optionally other co-catalyst components (e.g., a Lewis acid or a Lewis base). In one or more embodiments, the heavy metal compound may be referred to as a coordinating metal compound.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Useful coordination catalyst systems include lanthanide-based catalyst systems. These catalyst systems may advantageously produce cis-1,4-polydienes that, prior to quenching, have reactive chain ends and may be referred to as pseudo-living polymers. For example, the coordination catalyst systems may include (a) a lanthanide-containing compound, (b) an alkylating agent, and (c) a halogen source. In other embodiments, a compound containing a non-coordinating anion or a non-coordinating anion precursor may be employed in lieu of a halogen source. In these or other embodiments, other organometallic compounds, Lewis bases, and/or catalyst modifiers can be employed in addition to the ingredients or components set forth above.

Polymerization Procedures

Regardless of whether the polymer is prepared by anionic polymerization techniques or coordination catalysis, the polymerization may be conducted in any conventional polymerization vessels known in the art. For example, the polymerization can be conducted in a conventional stirred-tank reactor. In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

In one or more embodiments, the polymerization may be conducted in solution, which refers to a system that includes at least 20 wt %, in other embodiments at least 40 wt %, in other embodiments at least 60 wt %, and in other embodiments at least 70 wt % solvent. The monomer and/or polymer product may be dissolved or suspended in the solvent. In other embodiments, the polymerization may be conducted in a bulk system, which is a system wherein the monomer generally serves as a solvent in which the polymer product is suspended or dissolved. In particular embodiments, the polymerization in conducted in less than 10 wt %, in other embodiment less than 5 wt %, and in other embodiments less than 3 wt % solvent.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about $-10°$ C. to about $200°$ C., in other embodiments from about $0°$ C. to about $150°$ C., and in other embodiments from about $20°$ C. to about $100°$ C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Terminal Functionalization

Once a desired monomer conversion is achieved, but before the polymerization is quenched (e.g., by using a quenching agent), the reactive end of the polymer can be functionalized by reacting the polymer chain end with a terminating agent, which may also be referred to as a functionalizing agent. In one or more embodiments, at least about 30% of the polymer molecules contain a living end, in other embodiments at least about 50% of the polymer molecules contain a living end, and in other embodiments at least about 80% contain a living end.

Practice of the present invention is not limited by the selection of any particular functionalizing agent, or even by the requirement that a functionalizing agent be employed, so long as a hydrolyzable group is imparted to the polymer by either the initiator or a functionalizing agent. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135, 716, 5,332,810, 5,109,907, 5,210,145, 5,227,431, 5,329,005, 5,935,893, which are incorporated herein by reference. Other examples include trialkyltin halides such as tributyltin chloride, as disclosed in U.S. Pat. Nos. 4,519,431, 4,540, 744, 4,603,722, 5,248,722, 5,349,024, 5,502,129, and 5,877, 336, which are incorporated herein by reference. Still other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference.

In one or more embodiments, a silicon-containing functionalizing agent is employed. These terminating agents, which may also be referred to as a siloxane terminating agents or alkoxysilane terminating agents, may be defined by the formula

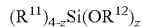

where $R^{11}$ is a halogen atom or a monovalent organic group, $R^{12}$ is a monovalent organic group, and z is an integer from 1 to 4. Halogens include chlorine, bromine, iodine, and fluorine. In one embodiment, the halogen includes chlorine. Techniques for preparing siloxane-terminated polymers are set forth in U.S. Pat. Nos. 3,244,664, 6,008,295, 6,228,908, and 4,185,042, which are incorporated herein by reference.

Suitable examples of siloxane terminating agents include tetraalkoxysilanes, alkylalkoxysilanes, arylalkoxysilanes, alkenylalkoxysilanes, and haloalkoxysilanes.

Examples of tetraalkoxysilane compounds include tetramethyl orthosilicate, tetraethyl orthosilicate, tetrapropyl orthosilicate, tetrabutyl orthosilicate, tetra(2-ethylhexyl) orthosilicate, tetraphenyl orthosilicate, tetratoluoyloxysilane, and the like.

Examples of alkylalkoxysilane compounds include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), γ-methacryloxy propyl trimethoxysilane and the like.

Examples of arylalkoxysilane compounds include phenyltrimethoxysilane, phenyltriethoxysilane, phenyltri-n-propoxysilane, phenyltri-n-butoxysilane, phenyltriphenoxysilane, and the like.

Examples of alkenylalkoxysilane compounds include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, and the like.

Examples of haloalkoxysilane compounds include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

In yet other embodiments, the polymers are terminated with nitrogen-containing alkoxysilane compounds, such as those disclosed in U.S. Publ. Nos. 2005/0009979, 2010/0113683, 2011/0092633, 2007/0088132, 2005/0070672, 2005/0020757, 2004/0254301, 2006/0173138, 2007/0185267, and 2008/0103261 which are incorporated herein by reference. In particular embodiments, nitrogen-containing alkoxysilanes include (aminohydrocarbyl) (hydrocarbyl) (dihydrocarbyloxy) silanes, di(aminohydrocarbyl) (dihydrocarbyloxy) silanes, (aminohydrocarbyl) (trihydrocarbyloxy) silanes, di(aminohydrocarbyl) (hydrocarbyl) (hydrocarbyloxy) silanes, and di(aminohydrocarbyl) (dihydrocarbyl) (hydrocarbyloxy) silanes. Specific examples of (aminohydrocarbyl) (hydrocarbyl) (dihydrocarbyloxy) silanes include aminopropyldiethoxysilane, aminobutyldimethoxysilane, aminopropyldiphenoxysilane, and aminopentyldiethoxysilane. Other examples include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 341-pyrrolidinyepropyl(triethoxy)silane, 3-(1-pyrrolidinyepropyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(diethoxy)methylsilane, 3-(1-hexamethyleneimino)propyl(diethoxy)ethylsilane and N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N'-dimethylaminobenzylidene)-3-(triethoxysilyl)-1-propaneamine, N-(cyclohexylidene)-3-(triethoxysilyl) 1-propaneamine, trimethoxysilyl compounds, methyldiethoxysilyl compounds, ethyldiethoxysilyl compounds, methyldimethoxysilyl compounds and ethyldimethoxysilyl compounds corresponding to these triethoxysilyl compounds, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole and N-(3-methyldiethoxysilylpropyl)-4,5-dihydroimidazole.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1_n M^1 X_{4-n}$, the formula (2) $M^1 X_4$, and the formula (3) $M^2 X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorous atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1_n M^1 (OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functionalized polymers is best described with respect to the equivalents of lithium or metal cation associated with the initiator. For example, the moles of functionalizing agent per mole of lithium may be about 0.3 to about 2, in other embodiments from about 0.6 to about 1.5, in other embodiments from about 0.7 to about 1.3, in other embodiments from about 0.8 to about 1.1, and in other embodiments from about 0.9 to about 1.0.

In one or more embodiments, the reaction between the functionalizing agent and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below under an inert atmosphere. In one or more embodiments, the reaction between the functionalizing agent and the reactive polymer may take place at a temperature from about 10° C. to about 150° C., and in other embodiments from about 20° C. to about 100° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

In one or more embodiments, after the reaction between the reactive polymer and the functionalizing agent has been accomplished or completed, a quenching agent can be added to the polymerization mixture in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

Stabilizing Agents

Once the polymer containing a hydrolyzable group is provided, the polymer may be treated pursuant to the present invention. In one or more embodiments, the polymer is treated by adding, which may also be referred to as introducing, an alkoxysilane to the polymer cement including the polymer to be treated. In one or more embodiments, the alkoxysilane is added to the polymer cement after the polymer and/or polymerization mixture has been terminated with a functionalizing agent and/or optionally quenched with a quenching agent. Once the polymer has been treated with the alkoxysilane (i.e, the alkoxysilane has been added to the polymerization cement), the silane including a hydrolyzable group that forms an acidic species upon hydrolysis is added to the polymer cement (i.e., the polymer is subsequently treated with the silane having a hydrolyzable group that forms an acidic species upon hydrolysis).

In one or more embodiments, alkoxysilanes include those compounds including at least one Si—OR substituent. In one or more embodiments, alkoxysilanes may be defined by the formula I:

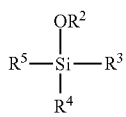

where $R^2$ is a hydrocarbyl group, $R^3$, $R^4$, and $R^5$ are each independently a hydrocarbyl group or a hydrocarbyloxy group. In particular embodiments, $R^3$, $R^4$, and $R^5$ are hydrocarbyl groups. In other embodiments, $R^3$ and $R^4$ are hydrocarbyl groups and $R^5$ is a hydrocarbyloxy group. In other embodiments, $R^3$ is a hydrocarbyl group and $R^4$ and $R^5$ are hydrocarbyloxy groups. In certain embodiments, $R^3$, $R^4$, and $R^5$ are all hydrocarbyloxy groups.

In one or more embodiments, the hydrocarbyl groups of the alkoxysilane include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, the hydrocarbyl groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, the hydrocarbyloxy groups of the alkoxysilane include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. Substituted hydrocarbyloxy groups include hydrocarbyloxy groups in which one or more hydrogen atoms attached to a carbon atom have been replaced by a substituent such as an alkyl group. In one or more embodiments, the hydrocarbyloxy groups may include from one, or the appropriate minimum number of carbon atoms to form the group, to 20 carbon atoms. The hydrocarbyloxy groups may contain heteroatoms such as, but not limited to nitrogen, boron, oxygen, silicon, sulfur, and phosphorus atoms.

In one or more embodiments, types of alkoxysilanes include trihydrocarbyl hydrocarbyloxy silanes, dihydrocarbyl dihydrocarbyloxy silanes, hydrocarbyl trihydrocarbyloxy silanes, and tetrahydrocarbyloxy silanes.

Specific examples of trihydrocarbyl hydrocarbyloxy silanes include diethylmethylmethoxysilane, dipropylmethylmethoxysilane, diphenylmethylmethoxysilane, dimethylethylmethoxysilane, dipropylethylmethoxysilane, diphenylethylmethoxysilane, dimethylpropylmethoxysilane, diethylpropylmethoxysilane, diphenylpropylmethoxysilane, dimethylphenylmethoxysilane, diethylphenylmethoxysilane, dipropylphenylmethoxysilane, dimethyloctylmethoxysilane, diethyloctylmethoxysilane, dipropyloctylmethoxysilane, diphenyloctylmethoxysilane, dimethyldecylmethoxysilane, diethyldecylmethoxysilane, dipropyldecylmethoxysilane, diphenyldecylmethoxysilane, diethylmethylethoxysilane, dipropylmethylethoxysilane, diphenylmethylethoxysilane, dimethylethylethoxysilane, dipropylethylethoxysilane, diphenylethylethoxysilane, dimethylpropylethoxysilane, diethylpropylethoxysilane, diphenylpropylethoxysilane, dimethylphenylethoxysilane, diethylphenylethoxysilane, dipropylphenylethoxysilane, dimethyloctylethoxysilane, diethyloctylethoxysilane, dipropyloctylethoxysilane, diphenyloctylethoxysilane, dimethyldecylethoxysilane, diethyldecylethoxysilane, dipropyldecylethoxysilane, diphenyldecylethoxysilane, diethylmethylphenoxysilane, dipropylmethylphenoxysilane, diphenylmethylphenoxysilane, dimethylethylphenoxysilane, dipropylethylphenoxysilane, diphenylethylphenoxysilane, dimethylpropylphenoxysilane, diethylpropylphenoxysilane, diphenylpropylphenoxysilane, dimethylphenylphenoxysilane, diethylphenylphenoxysilane, dipropylphenylphenoxysilane, dimethyloctylphenoxysilane, diethyloctylphenoxysilane, dipropyloctylphenoxysilane, diphenyloctylphenoxysilane, dimethyldecylphenoxysilane, diethyldecylphenoxysilane, dipropyldecylphenoxysilane, diphenyldecylphenoxysilane, trimethylmethoxysilane, triethylmethoxysilane, tripropylmethoxysilane, triphenylmethoxysilane, trimethylethoxysilane, triethylethoxysilane, tripropylethoxysilane, triphenylethoxysilane, trimethylphenoxysilane, triethylphenoxysilane, tripropylphenoxysilane, triphenylphenoxysilane, propylmethylethylmethoxysilane, phenylmethylethylmethoxysilane, octylmethylethylmethoxysilane, decylmethylethylmethoxysilane, methylpropylethylmethoxysilane, phenylpropylethylmethoxysilane, octylpropylethylmethoxysilane, decylpropylethylmethoxysilane, methylphenylethylmethoxysilane, propylphenylethylmethoxysilane, octylphenylethylmethoxysilane, decylphenylethylmethoxysilane, methyldecylethylmethoxysilane, propyldecylethylmethoxysilane, phenyldecylethylmethoxysilane, octyldecylethylmethoxysilane, phenylmethylpropylmethoxysilane, octylmethylpropylmethoxysilane, decylmethylpropylmethoxysilane, methylphenylpropylmethoxysilane, octylphenylpropylmethoxysilane, decylphenylpropylmethoxysilane, methyloctylpropylmethoxysilane, phenyloctylpropylmethoxysilane, decyloctylpropylmethoxysilane, methyldecylpropylmethoxysilane, phenyldecylpropylmethoxysilane, octyldecylpropylmethoxysilane, octylmethylphenylmethoxysilane, decylmethylphenylmethoxysilane, methyloctylphenylmethoxysilane, decyloctylphenylmethoxysilane, methyldecylphenylmethoxysilane, octyldecylphenylmethoxysilane, propylmethylethylethoxysilane, phenylmethylethylethoxysilane, octylmethylethylethoxysilane, decylmethylethylethoxysilane, methylpropylethylethoxysilane, phenylpropylethylethoxysilane, octylpropylethylethoxysilane, decylpropylethylethoxysilane, methylphenylethylethoxysilane, propylphenylethylethoxysilane, octylphenylethylethoxysilane, methyloctylethylethoxysilane, decylphenylethylethoxysilane, methyloctylethylethoxysilane, propyloctylethylethoxysilane, phenyloctylethylethoxysilane, decyloctylethylethoxysilane, methyldecylethylethoxysilane, propyldecylethylethoxysilane, phenyldecylethylethoxysilane, octyldecylethylethoxysilane, phenylmethylpropylethoxysilane, octylmethylpropylethoxysilane, decylmethylpropylethoxysilane, methylphenylpropylethoxysilane, octylphenylpropylethoxysilane, decylphenylpropylethoxysilane, methyloctylpropylethoxysilane, phenyloctylpropylethoxysilane, decyloctylpropylethoxysilane, methyldecylpropylethoxysilane, phenyldecylpropylethoxysilane, octyldecylpropylethoxysilane, octylmethylphenylethoxysilane, decylmethylphenylethoxysilane, methyloctylphenylethoxysilane, decyloctylphenylethoxysilane, methyldecylphenylethoxysilane, octyldecylphenylethoxysilane, propylmethylethylphenoxysilane, phenylmethylethylphenoxysilane, octylmethylethylphenoxysilane, decylmethylethylphenoxysilane, methylpropylethylphenoxysilane, phenylpropylethylphenoxysilane, octylpropylethylphenoxysilane, decylpropylethylphenoxysilane, methylphenylethylphenoxysilane, propylphenylethylphenoxysilane, octylphenylethylphenoxysilane, decylphenylethylphenoxysilane, methyloctylethylphenoxysilane, propyloctylethylphenoxysilane, phenyloctylethylphenoxysilane, decyloctylethylphenoxysilane, methyldecylethylphenoxysilane, propyldecylethylphenoxysilane, phenyldecylethylphenoxysilane, octyldecylethylphenoxysilane, phenylmethylpropylphenoxysilane, octylmethylpropylphenoxysilane, decylmethylpropylphenoxysilane, methylphenylpropylphenoxysilane, octylphenylpropylphenoxysilane, decylphenylpropylphenoxysilane, methyloctylpropylphenoxysilane, phenyloctylpropylphenoxysilane, decyloctylpropylphenoxysilane, methyldecylpropylphenoxysilane, phenyldecylpropylphenoxysilane, octyldecylpropylphenoxysilane, octylmethylphenylphenoxysilane, decylmethylphenylphenoxysilane, methyloctylphenylphenoxysilane, decyloctylphenylphenoxysilane, methyldecylphenylphenoxysilane, and octyldecylphenylphenoxysilane.

Specific examples of dihydrocarbyl dihydrocarbyloxy silanes include dimethyldimethoxysilane, diethyldimethoxysilane, dipropyldimethoxysilane, diphenyldimethoxysilane, diphenyldiethoxysilane, diphenylpropoxysilane, diphenyldibutoxysilane, diphenyldipentoxysilane, dimethyldiethoxysilane, diethyldiethoxysilane, dipropyldiethoxysilane, diphenyldiethoxysilane, dimethyldiphenoxysilane, diethyldiphenoxysilane, dipropyldiphenoxysilane, diphenyldiphenoxysilane, ethylmethyldimethoxysilane, propylmethyldimethoxysilane, phenylmethyldimethoxysilane, methylethyldimethoxysilane, propylethyldimethoxysilane, phenylethyldimethoxysilane, methylpropyldimethoxysilane, ethylpropyldimethoxysilane, phenylpropyldimethoxysilane, methylphenyldimethoxysilane, ethylphenyldimethoxysilane, propylphenyldimethoxysilane, methyloctyldimethoxysilane, ethyloctyldimethoxysilane, propyloctyldimethoxysilane, phenyloctyldimethoxysilane, methyldecyldimethoxysilane, ethyldecyldimethoxysilane, propyldecyldimethoxysilane, phenyldecyldimethoxysilane, ethylmethyldiethoxysilane, propylmethyldiethoxysilane, phenylmethyldiethoxysilane, methylethyldiethoxysilane, propylethyldiethoxysilane, phenylethyldiethoxysilane, methylpropyldiethoxysilane, ethylpropyldiethoxysilane, phenylpropyldiethoxysilane, methylphenyldiethoxysilane, ethylphenyldiethoxysilane, propylphenyldiethoxysilane, methyloctyldiethoxysilane, ethyloctyldiethoxysilane, propyloctyldiethoxysilane, phenyloctyldiethoxysilane, methyldecyldiethoxysilane, ethyldecyldiethoxysilane, propyldecyldiethoxysilane, phenyldecyldiethoxysilane, ethylmethyldiphenoxysilane, propylmethyldiphenoxysilane, phenylmethyldiphenoxysilane, methylethyldiphenoxysilane, propylethyldiphenoxysilane, phenylethyldiphenoxysilane, methylpropyldiphenoxysilane, ethylpropyldiphenoxysilane, phenylpropyldiphenoxysilane, methylphenyldiphenoxysilane, ethylphenyldiphenoxysilane, propylphenyldiphenoxysilane, methyloctyldiphenoxysilane, ethyloctyldiphenoxysilane, propyloctyldiphenoxysilane, phenyloctyldiphenoxysilane, methyldecyldiphenoxysilane, ethyldecyldiphenoxysilane, propyldecyldiphenoxysilane, phenyldecyldiphenoxysilane, ethoxymethoxysilane, phenoxymethoxysilane, phenoxyethoxysilane, ethylmethylethoxymethoxysilane, propylmethylethoxymethoxysilane, phenylmethylethoxymethoxysilane, octylmethylethoxymethoxysilane, decylmethylethoxymethoxysilane, propylethylethoxymethoxysilane, phenylethylethoxymethoxysilane, octylethylethoxymethoxysilane, decylethylethoxymethoxysilane, phenylpropylethoxymethoxysilane, octylpropylethoxymethoxysilane, decylpropylethoxymethoxysilane, octylphenylethoxymethoxysilane, decylphenylethoxymethoxysilane, decyloctylethoxymethoxysilane, ethylmethylphenoxymethoxysilane, propylmethylphenoxymethoxysilane, phenylmethylphenoxymethoxysilane, octylmethylphenoxymethoxysilane, decylmethylphenoxymethoxysilane, propylethylphenoxymethoxysilane, phenylethylphenoxymethoxysilane, octylethylphenoxymethoxysilane, decylethylphenoxymethoxysilane, phenylpropylphenoxymethoxysilane, octylpropylphenoxymethoxysilane, decylpropylphenoxymethoxysilane, octylphenylphenoxymethoxysilane, decylphenylphenoxymethoxysilane, decyloctylphenoxymethoxysilane, ethylmethylphenoxyethoxysilane, propylmethylphenoxyethoxysilane, phenylmethylphenoxyethoxysilane, octylmethylphenoxyethoxysilane, decylmethylphenoxyethoxysilane, propylethylphenoxyethoxysilane, phenylethylphenoxyethoxysilane, octylethylphenoxyethoxysilane, decylethylphenoxyethoxysilane, phenylpropylphenoxyethoxysilane, octylpropylphenoxyethoxysilane, decylpropylphenoxyethoxysilane, octylphenylphenoxyethoxysilane, decylphenylphenoxyethoxysilane, and decyloctylphenoxyethoxysilane.

Specific examples of hydrocarbyl trihydrocarbyloxy silanes include methyltrimethoxysilane, ethyltrimethoxysilane, propyltrimethoxysilane, phenyltrimethoxysilane, octyltrimethoxysilane, decyltrimethoxysilane, methyltriethoxysilane, ethyltriethoxysilane, propyltriethoxysilane, phenyltriethoxysilane, octyltriethoxysilane, decyltriethoxysilane, methyltriphenoxysilane, ethyltriphenoxysilane, propyltriphenoxysilane, octyltriphenoxysilane, phenyltriphenoxysilane, decyltriphenoxysilane, methyldiethoxymethoxysilane, ethyldiethoxymethoxysilane, propyldiethoxymethoxysilane, phenyldiethoxymethoxysilane, octyldiethoxymethoxysilane, decyldiethoxymethoxysilane, methyldiphenoxymethoxysilane, ethyldiphenoxymethoxysilane, propyldiphenoxymethoxysilane, phenyldiphenoxymethoxysilane, octyldiphenoxymethoxysilane, decyldiphenoxymethoxysilane, methyldimethoxyethoxysilane, ethyldimethoxyethoxysilane, propyldimethoxyethoxysilane, phenyldimethoxyethoxysilane, octyldimethoxyethoxysilane, decyldimethoxyethoxysilane, methyldiphenoxyethoxysilane, ethyldiphenoxyethoxysilane, propyldiphenoxyethoxysilane, phenyldiphenoxyethoxysilane, octyldiphenoxyethoxysilane, decyldiphenoxyethoxysilane, methyldimethoxyphenoxysilane, ethyldimethoxyphenoxysilane, propyldimethoxyphenoxysilane, phenyldimethoxyphenoxysilane, octyldimethoxyphenoxysilane, decyldimethoxyphenoxysilane, methyldiethoxyphenoxysilane, ethyldiethoxyphenoxysilane, propyldiethoxyphenoxysilane, phenyldiethoxyphenoxysilane, octyldiethoxyphenoxysilane, decyldiethoxyphenoxysilane, methylmethoxyethoxyphenoxysilane, ethylmethoxyethoxyphenoxysilane, propylmethoxyethoxyphenoxysilane, phenylmethoxyethoxyphenoxysilane, octylmethoxyethoxyphenoxysilane, and decylmethoxyethoxyphenoxysilane.

Specific examples of tetrahydrocarbyloxy silanes include tetramethoxysilane, tetraethoxysilane, tetrapropoxysilane, tetraphenoxysilane, methoxytrimethoxysilane, ethoxytrimethoxysilane, propoxytrimethoxysilane, phenoxytrimethoxysilane, methoxytriethoxysilane, ethoxytriethoxysilane, propoxytriethoxysilane, phenoxytriethoxysilane, methoxytripropoxysilane, ethoxytripropoxysilane, propoxytripropoxysilane, phenoxytripropoxysilane, methoxytriphenoxysilane, ethoxytriphenoxysilane, propoxytriphenoxysilane, phenoxytriphenoxysilane, diethoxydimethoxysilane, dipropoxydimethoxysilane, diphenoxydimethoxysilane, dimethoxydiethoxysilane, dipropoxydiethoxysilane, diphenoxydiethoxysilane, dimethoxydipropoxysilane, diethoxydipropoxysilane, diphenoxydipropoxysilane, dimethoxydiphenoxysilane, diethoxydiphenoxysilane, and dipropoxydiphenoxysilane.

In one or more embodiments, the silanes including a hydrolyzable group that forms an acidic species upon hydrolysis may be defined by the formula II:

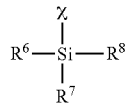

where χ is a hydrolyzable group that forms an acidic species upon hydrolysis, where $R^6$, $R^7$, and $R^8$ are each independently a halogen atom, a hydrocarbyl group, a hydrocarboxylate group, or a hydrocarbyloxy group. In one or more embodiments, χ may include a halogen atom. In other embodiments, χ may include a hydrocarboxylate group, which may also be referred to as a hydrocarbonate group.

In one or more embodiments, the hydrocarbyl groups of the silanes include, but are not limited to, alkyl, cycloalkyl, substituted cycloalkyl, alkenyl, cycloalkenyl, substituted cycloalkenyl, aryl, allyl, substituted aryl, aralkyl, alkaryl, or alkynyl groups. Substituted hydrocarbyl groups include hydrocarbyl groups in which one or more hydrogen atoms have been replaced by a substituent such as an alkyl group. In one or more embodiments, the hydrocarbyl groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

In one or more embodiments, the hydrocarbyloxy groups of the silanes include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. Substituted hydrocarbyloxy groups include hydrocarbyloxy groups in which one or more hydrogen atoms attached to a carbon atom have been replaced by a substituent such as an alkyl group. In one or more embodiments, the hydrocarbyloxy groups may include from one, or the appropriate minimum number of carbon atoms to form the group, to 20 carbon atoms. The hydrocarbyloxy groups may contain heteroatoms such as, but not limited to nitrogen, boron, oxygen, silicon, sulfur, and phosphorus atoms.

In one or more embodiments, hydrocarboxylate groups of the silanes, which may also be referred to as hydrocarbonate groups, include, but are not limited to, alkanoate, cycloalkanoate, substituted cycloalkanoate, alkenoate, cycloalkenoate, substituted cycloalkenoate, aranoate, alloate, substituted aranoate, aralkanoate, alkaranoate, or alkynanoate groups.

In one or more embodiments, the halogen atoms may be selected from bromine, chlorine, and iodine.

In particular embodiments, $R^6$ is a halogen atom. In these or other embodiments, both $R^6$ and $R^7$ are halogen atoms. In these or other embodiments, each of $R^6$, $R^7$, and $R^8$ are halogen atoms. In particular embodiments, χ, $R^6$, $R^7$, and $R^8$ are each halogen atoms such as chlorine atoms. In other embodiments, the χ is a halogen atom, and each of $R^6$, $R^7$, and $R^8$ is a hydrocarbyl group. In yet other embodiments, $R^6$ is a halogen atoms, and each of $R^7$ and $R^8$ are hydrocarbyl groups.

In one or more embodiments, types of silanes that include a hydrolyzable group that forms an acidic species on hydrolysis that may be employed in practicing the present invention include silyl halides and silyl esters.

In one or more embodiments, types of silyl halides include trihydrocarbyl silyl halides, (dihydrocarbyl) (hydrocarbyloxy) silyl halides, (hydrocarbyl) (dihydrocarbyloxy) silyl halides, trihydrocarbyloxy silyl halides, dihydrocarbyl silyl dihalides, (hydrocarbyl) (hydrocarbyloxy) silyl dihalides, hydrocarbyl silyl trihalides, hydrocarbyloxy silyl trihalides, and silyl tetrahalides.

In one or more embodiments, types of silyl esters include trihydrocarbyl silyl hydrocarboxylates, (dihydrocarbyl) (hydrocarbyloxy) silyl hydrocarboxylates, (hydrocarbyl) (dihydrocarbyloxy) silyl hydrocarboxylates, trihydrocarbyloxy silyl hydrocarboxylates, dihydrocarbyl silyl dihydrocarboxylates, (hydrocarbyl) (hydrocarbyloxy) silyl dihydrocarboxylates, hydrocarbyl silyl trihydrocarboxylates, hydrocarbyloxy silyl trihydrocarboxylates, and silyl tetrahydrocarboxylates.

In one or more embodiments, mixed silyl halide-esters are contemplated. In one or more embodiments, these compounds may include (dihydrocarbyl) (hydrocarboxylate) silyl halides, (hydrocarbyl) (hydrocarbyloxy) (hydrocarboxylate) silyl halides, (dihydrocarbyloxy) (hydrocarboxylate) silyl halides, (hydrocarbyloxy) (dihydrocarboxylate) silyl halides, (hydrocarbyl) (dihydrocarboxylate) silyl halides, trihydrocarboxylate silyl halides, (hydrocarbyl) (hydrocarboxylate) silyl dihalides, (hydrocarbyloxy) (hydrocarboxylate) silyl dihalides, dihydrocarboxylate silyl dihalides, and hydrocarboxylate silyl trihalides.

Specific examples of trihydrocarbyl silyl halides include trimethyl silyl chloride, triethyl silyl chloride, tri-n-propyl silyl chloride, triisopropyl silyl chloride, tri-n-butyl silyl chloride, tri-t-butyl silyl chloride, tri-n-pentyl silyl chloride, trihexyl silyl chloride, triheptyl silyl chloride, trioctyl silyl chloride, triphenyl silyl chloride, tricyclopentyl silyl chloride, tricyclohexyl silyl chloride, octyl dimethyl silyl chloride, heptyl dimethyl silyl chloride, hexyl dimethyl silyl chloride, phenyl dimethyl silyl chloride, cyclopentyl dimethyl silyl chloride, cyclohexyl dimethyl silyl chloride, octyl diethyl silyl chloride, heptyl diethyl silyl chloride, hexyl diethyl silyl chloride, phenyl diethyl silyl chloride, cyclopentyl diethyl silyl chloride, cyclohexyl diethyl silyl chloride, octyl dipropyl silyl chloride, heptyl dipropyl silyl chloride, hexyl dipropyl silyl chloride, phenyl dipropyl silyl chloride, cyclopentyl dipropyl silyl chloride, cyclohexyl dipropyl silyl chloride, dioctyl methyl silyl chloride, diheptyl methyl silyl chloride, dihexyl methyl silyl chloride, diphenyl methyl silyl chloride, dicyclopentyl methyl silyl chloride, dicyclohexyl methyl silyl chloride, dioctyl ethyl silyl chloride, diheptyl ethyl silyl chloride, dihexyl ethyl silyl chloride, diphenyl ethyl silyl chloride, dicyclopentyl ethyl silyl chloride, dicyclohexyl ethyl silyl chloride, dioctyl propyl silyl chloride, diheptyl propyl silyl chloride, dihexyl propyl silyl chloride, diphenyl propyl silyl chloride, dicyclopentyl propyl silyl chloride, and dicyclohexyl propyl silyl chloride.

Specific examples of dihydrocarbyl silyl dihalide include dimethyl silyl dichloride, diethyl silyl dichloride, di-n-propyl silyl dichloride, diisopropyl silyl dichloride, di-n-butyl silyl dichloride, di-t-butyl silyl dichloride, di-n-pentyl silyl dichloride, dihexyl silyl dichloride, diheptyl silyl dichloride, dioctyl silyl dichloride, diphenyl silyl dichloride, dicyclopentyl silyl dichloride, dicyclohexyl silyl dichloride, octyl methyl silyl dichloride, heptyl methyl silyl dichloride, hexyl methyl silyl dichloride, phenyl methyl silyl dichloride, cyclopentyl methyl silyl dichloride, cyclohexyl methyl silyl dichloride, octyl ethyl silyl dichloride, heptyl ethyl silyl dichloride, hexyl ethyl silyl dichloride, phenyl ethyl silyl dichloride, cyclopentyl ethyl silyl dichloride, cyclohexyl ethyl silyl dichloride, octyl propyl silyl dichloride, heptyl propyl silyl dichloride, hexyl propyl silyl dichloride, phenyl propyl silyl dichloride, cyclopentyl propyl silyl dichloride, and cyclohexyl propyl silyl dichloride.

Specific examples of hydrocarbyl silyl trihalide include methyl silyl trichloride, ethyl silyl trichloride, n-propyl silyl trichloride, isopropyl silyl trichloride, n-butyl silyl trichloride, t-butyl silyl trichloride, n-pentyl silyl trichloride, hexyl silyl trichloride, heptyl silyl trichloride, octyl silyl trichloride, phenyl silyl trichloride, cyclopentyl silyl trichloride, and cyclohexyl silyl trichloride.

A specific example of silicon tetrahalide includes silicon tetrachloride.

Specific examples of (dihydrocarbyl) (hydrocarbyloxy) silyl halides include dimethylmethoxy silyl chloride, diethylmethoxy silyl chloride, di-n-propylmethoxy silyl chloride, diisopropylmethoxy silyl chloride, di-n-butylmethoxy silyl chloride, diisobutylmethoxy silyl chloride, di-n-pentylmethoxy silyl chloride, di-neopentylmethoxy silyl chloride, di-n-hexylmethoxy silyl chloride, dimethylethoxy silyl chloride, diethylethoxy silyl chloride, di-n-propylethoxy silyl chloride, diisopropylethoxy silyl chloride, di-n-butylethoxy silyl chloride, diisobutylethoxy silyl chloride, di-n-pentylethoxy silyl chloride, di-neopentylethoxy silyl chloride, and di-n-hexylethoxy silyl chloride.

Specific examples of (hydrocarbyl) (dihydrocarbyloxy) silyl halides include methyldimethoxy silyl chloride, ethyldimethoxy silyl chloride, n-propyldimethoxy silyl chloride, isopropyldimethoxy silyl chloride, n-butyldimethoxy silyl chloride, isobutyldimethoxy silyl chloride, n-pentyldimethoxy silyl chloride, neopentyldimethoxy silyl chloride, n-hexyldimethoxy silyl chloride, methyldiethoxy silyl chloride, ethyldiethoxy silyl chloride, n-propyldiethoxy silyl chloride, isopropyldiethoxy silyl chloride, n-butyldiethoxy silyl chloride, isobutyldiethoxy silyl chloride, n-pentyldiethoxy silyl chloride, neopentyldiethoxy silyl chloride, and n-hexyldiethoxy silyl chloride.

Specific examples of trihydrocarbyl silyl hydrocarboxylates include trimethyl silyl hexanoate, triethyl silyl hexanoate, tri-n-propyl silyl hexanoate, triisopropyl silyl hexanoate, tri-n-butyl silyl hexanoate, tri-t-butyl silyl hexanoate, tri-n-pentyl silyl hexanoate, trihexyl silyl hexanoate, triheptyl silyl hexanoate, trioctyl silyl hexanoate, triphenyl silyl hexanoate, tricyclopentyl silyl hexanoate, tricyclopentyl silyl hexanoate, tricyclohexyl silyl hexanoate, octyl dimethyl silyl hexanoate, heptyl dimethyl silyl hexanoate, hexyl dimethyl silyl hexanoate, phenyl dimethyl silyl hexanoate, cyclopentyl dimethyl silyl hexanoate, cyclohexyl dimethyl silyl hexanoate, octyl diethyl silyl hexanoate, heptyl diethyl silyl hexanoate, hexyl diethyl silyl hexanoate, phenyl diethyl silyl hexanoate, cyclopentyl diethyl silyl hexanoate, cyclohexyl diethyl silyl hexanoate, octyl dipropyl silyl hexanoate, heptyl dipropyl silyl hexanoate, hexyl dipropyl silyl hexanoate, phenyl dipropyl silyl hexanoate, cyclopentyl dipropyl silyl hexanoate, cyclohexyl dipropyl silyl hexanoate, dioctyl methyl silyl hexanoate, diheptyl methyl silyl hexanoate, dihexyl methyl silyl hexanoate, diphenyl methyl silyl hexanoate, dicyclopentyl methyl silyl hexanoate, dicyclohexyl methyl silyl hexanoate, dioctyl ethyl silyl hexanoate, diheptyl ethyl silyl hexanoate, dihexyl ethyl silyl hexanoate, diphenyl ethyl silyl hexanoate, dicyclopentyl ethyl silyl hexanoate, dicyclohexyl ethyl silyl hexanoate, dioctyl propyl silyl hexanoate, diheptyl propyl silyl hexanoate, dihexyl propyl silyl hexanoate, diphenyl propyl silyl hexanoate, dicyclopentyl propyl silyl hexanoate, and dicyclohexyl propyl silyl hexanoate, trimethyl silyl pentanoate, triethyl silyl pentanoate, tri-n-propyl silyl pentanoate, triisopropyl silyl pentanoate, tri-n-butyl silyl pentanoate, tri-t-butyl silyl pentanoate, tri-n-pentyl silyl pentanoate, trihexyl silyl pentanoate, triheptyl silyl pentanoate, trioctyl silyl pentanoate, triphenyl silyl pentanoate, tricyclopentyl silyl pentanoate, tricyclohexyl silyl pentanoate, octyl dimethyl silyl pentanoate, heptyl dimethyl silyl pentanoate, hexyl dimethyl silyl pentanoate, phenyl dimethyl silyl pentanoate, cyclopentyl dimethyl silyl pentanoate, cyclohexyl dimethyl silyl pentanoate, octyl diethyl silyl pentanoate, heptyl diethyl silyl pentanoate, hexyl diethyl silyl pentanoate, phenyl diethyl silyl pentanoate, cyclopentyl diethyl silyl pentanoate, cyclohexyl diethyl silyl pentanoate, octyl dipropyl silyl pentanoate, heptyl dipropyl silyl pentanoate, hexyl dipropyl silyl pentanoate, phenyl dipropyl silyl pentanoate, cyclopentyl dipropyl silyl pentanoate, cyclohexyl dipropyl silyl pentanoate, dioctyl methyl silyl pentanoate, diheptyl methyl silyl pentanoate, dihexyl methyl silyl pentanoate, diphenyl methyl silyl pentanoate, dicyclopentyl methyl silyl pentanoate, dicyclohexyl methyl silyl pentanoate, dioctyl ethyl silyl pentanoate, diheptyl ethyl silyl pentanoate, dihexyl ethyl silyl pentanoate, diphenyl ethyl silyl pentanoate, dicyclopentyl ethyl silyl pentanoate, dicyclohexyl ethyl silyl pentanoate, dioctyl propyl silyl pentanoate, diheptyl propyl silyl pentanoate, dihexyl propyl silyl pentanoate, diphenyl propyl silyl pentanoate, dicyclopentyl propyl silyl pentanoate, dicyclohexyl propyl silyl pentanoate, tricyclopentyl silyl butanoate, tricyclohexyl silyl butanoate, octyl dimethyl silyl butanoate, heptyl dimethyl silyl butanoate, hexyl dimethyl silyl butanoate, phenyl dimethyl silyl butanoate, cyclopentyl dimethyl silyl butanoate, cyclohexyl dimethyl silyl butanoate, octyl diethyl silyl butanoate, heptyl diethyl silyl butanoate, hexyl diethyl silyl butanoate, phenyl diethyl silyl butanoate, cyclopentyl diethyl silyl butanoate, cyclohexyl diethyl silyl butanoate, octyl dipropyl silyl butanoate, heptyl dipropyl silyl butanoate, hexyl dipropyl silyl butanoate, phenyl dipropyl silyl butanoate, cyclopentyl dipropyl silyl butanoate, cyclohexyl dipropyl silyl butanoate, dioctyl methyl silyl butanoate, diheptyl methyl silyl butanoate, dihexyl methyl silyl butanoate, diphenyl methyl silyl butanoate, dicyclopentyl methyl silyl butanoate, dicyclohexyl methyl silyl butanoate, dioctyl ethyl silyl butanoate, diheptyl ethyl silyl butanoate, dihexyl ethyl silyl butanoate, diphenyl ethyl silyl butanoate, dicyclopentyl ethyl silyl butanoate, dicyclohexyl ethyl silyl butanoate, dioctyl propyl silyl butanoate, diheptyl propyl silyl butanoate, dihexyl propyl silyl butanoate, diphenyl propyl silyl butanoate, dicyclopentyl propyl silyl butanoate, and dicyclohexyl propyl silyl butanoate.

Specific examples of dihydrocarbyl silyl dihydrocarboxylates include dimethyl silyl dihexanoate, diethyl silyl dihexanoate, di-n-propyl silyl dihexanoate, diisopropyl silyl dihexanoate, di-n-butyl silyl dihexanoate, di-t-butyl silyl dihexanoate, di-n-pentyl silyl dihexanoate, dihexyl silyl dihexanoate, diheptyl silyl dihexanoate, dioctyl silyl dihexanoate, diphenyl silyl dihexanoate, dicyclopentyl silyl dihexanoate, dicyclohexyl silyl dihexanoate, octyl methyl silyl dihexanoate, heptyl methyl silyl dihexanoate, hexyl methyl silyl dihexanoate, phenyl methyl silyl dihexanoate, cyclopentyl methyl silyl dihexanoate, cyclohexyl methyl silyl dihexanoate, octyl ethyl silyl dihexanoate, heptyl ethyl silyl dihexanoate, hexyl ethyl silyl dihexanoate, phenyl ethyl silyl dihexanoate, cyclopentyl ethyl silyl dihexanoate, cyclohexyl ethyl silyl dihexanoate, octyl propyl silyl dihexanoate, heptyl propyl silyl dihexanoate, hexyl propyl silyl dihexanoate, phenyl propyl silyl dihexanoate, cyclopentyl propyl silyl dihexanoate, cyclohexyl propyl silyl dihexanoate, dimethyl silyl dipentanoate, diethyl silyl dipentanoate, di-n-propyl silyl dipentanoate, diisopropyl silyl dipentanoate, di-n-butyl silyl dipentanoate, di-t-butyl silyl dipentanoate, di-n-pentyl silyl dipentanoate, dihexyl silyl dipentanoate, diheptyl silyl dipentanoate, dioctyl silyl dipentanoate, diphenyl silyl dipentanoate, dicyclopentyl silyl dipentanoate, dicyclohexyl silyl dipentanoate, octyl methyl silyl dipentanoate, heptyl methyl silyl dipentanoate, hexyl methyl silyl dipentanoate, phenyl methyl silyl dipentanoate, cyclopentyl methyl silyl dipentanoate, cyclohexyl methyl silyl dipentanoate, octyl ethyl silyl dipentanoate, heptyl ethyl silyl dipentanoate, hexyl ethyl silyl dipentanoate, phenyl ethyl silyl dipentanoate, cyclopentyl ethyl silyl dipentanoate, cyclohexyl ethyl silyl dipentanoate, octyl propyl silyl dipentanoate, heptyl propyl silyl dipentanoate, hexyl propyl silyl dipentanoate, phenyl propyl silyl dipentanoate, cyclopentyl propyl silyl dipentanoate, cyclohexyl propyl silyl dipentanoate, dimethyl silyl dibutanoate, diethyl silyl dibutanoate, di-n-propyl silyl dibutanoate, diisopropyl silyl dibutanoate, di-n-butyl silyl dibutanoate, di-t-butyl silyl dibutanoate, di-n-pentyl silyl dibutanoate, dihexyl silyl dibutanoate, diheptyl silyl dibutanoate, dioctyl silyl dibutanoate, diphenyl silyl dibutanoate, dicyclopentyl silyl dibutanoate, dicyclohexyl silyl dibutanoate, octyl methyl silyl dibutanoate, heptyl methyl silyl dibutanoate, hexyl methyl silyl dibutanoate, phenyl methyl silyl dibutanoate, cyclopentyl methyl silyl dibutanoate, cyclohexyl methyl silyl dibutanoate, octyl ethyl silyl dibutanoate, heptyl ethyl silyl dibutanoate, hexyl ethyl silyl dibutanoate, phenyl ethyl silyl dibutanoate, cyclopentyl ethyl silyl dibutanoate, cyclohexyl ethyl silyl dibutanoate, octyl propyl silyl dibutanoate, heptyl propyl silyl dibutanoate, hexyl propyl silyl dibutanoate, phenyl propyl silyl dibutanoate, cyclopentyl propyl silyl dibutanoate, and cyclohexyl propyl silyl dibutanoate.

Specific examples of hydrocarbyl silyl trihydrocarboxylates include methyl silyl trihexanoate, ethyl silyl trihexanoate, n-propyl silyl trihexanoate, isopropyl silyl trihexanoate, n-butyl silyl trihexanoate, t-butyl silyl trihexanoate, n-pentyl silyl trihexanoate, hexyl silyl trihexanoate, heptyl silyl trihexanoate, octyl silyl trihexanoate, phenyl silyl trihexanoate, cyclopentyl silyl trihexanoate, cyclohexyl silyl trihexanoate, methyl silyl tripentanoate, ethyl silyl tripentanoate, n-propyl silyl tripentanoate, isopropyl silyl tripentanoate, n-butyl silyl tripentanoate, t-butyl silyl tripentanoate, n-pentyl silyl tripentanoate, hexyl silyl tripentanoate, heptyl silyl tripentanoate, octyl silyl tripentanoate, phenyl silyl tripentanoate, cyclopentyl silyl tripentanoate, cyclohexyl silyl tripentanoate, methyl silyl tributanoate, ethyl silyl tributanoate, n-propyl silyl tributanoate, isopropyl silyl tributanoate, n-butyl silyl tributanoate, t-butyl silyl tributanoate, n-pentyl silyl tributanoate, hexyl silyl tributanoate, heptyl silyl tributanoate, octyl silyl tributanoate, phenyl silyl tributanoate, cyclopentyl silyl tributanoate, and cyclohexyl silyl tributanoate.

A specific examples of silyl tetrahydrocarboxylates include silyl tetrahexanoate, silyl tetrapentanoate, and silyl tetrabutanoate.

Specific examples of (dihydrocarbyl) (hydrocarbyloxy) silyl esters include dimethylmethoxy silyl hexanoate, diethylmethoxy silyl pentanoate, di-n-propylmethoxy silyl butanoate, diisopropylmethoxy silyl hexanoate, di-n-butylmethoxy silyl pentanoate, diisobutylmethoxy silyl butanoate, di-n-pentylmethoxy silyl hexanoate, di-neopentylmethoxy silyl pentanoate, di-n-hexylmethoxy silyl butanoate, dimethylethoxy silyl hexanoate, diethylethoxy silyl pentanoate, di-n-propylethoxy silyl butanoate, diisopropylethoxy silyl hexanoate, di-n-butylethoxy silyl pentanoate, di-isobutylethoxy silyl butanoate, di-n-pentylethoxy silyl hexanoate, di-neopentylethoxy silyl pentanoate, and di-n-hexylethoxy silyl butanoate.

Specific examples of (hydrocarbyl) (dihydrocarbyloxy) silyl esters include methyldimethoxy silyl hexanoate, ethyldimethoxy silyl pentanoate, n-propyldimethoxy silyl butanoate, isopropyldimethoxy silyl hexanoate, n-butyldimethoxy silyl pentanoate, isobutyldimethoxy silyl butanoate, n-pentyldimethoxy silyl hexanoate, neopentyldimethoxy silyl pentanoate, n-hexyldimethoxy silyl butanoate, methyldiethoxy silyl hexanoate, ethyldiethoxy silyl pentanoate, n-propyldiethoxy silyl butanoate, isopropyldiethoxy silyl hexanoate, n-butyldiethoxy silyl pentanoate, isobutyldiethoxy silyl butanoate, n-pentyldiethoxy silyl hexanoate, neopentyldiethoxy silyl pentanoate, and n-hexyldiethoxy silyl butanoate.

Treatment with Stabilizing Agent

As indicated above, the polymers containing a hydrolyzable functionality may be treated by first introducing the alkoxysilane to a polymer cement containing the polymer to be treated followed by introducing the silane including a hydrolyzable group that forms an acidic species upon hydrolysis to the polymer cement.

In one or more embodiments, the amount of alkoxysilane employed may be at least 0.1, in other embodiments at least 1, in other embodiments at least 2, in other embodiments at least 3, and in other embodiments at least 5 moles of alkoxysilane per mole of polymer to be treated (which is equivalent to, for example, the moles of lithium employed in anionically polymerizing a polymer). In these or other embodiments, the amount of alkoxysilane employed may be at most 15, in other embodiments at most 12, in other embodiments at most 10, and in other embodiments at most 9 moles of alkoxysilane per mole of polymer to be treated. In one or more embodiments, the amount of alkoxysilane employed may be from about 0.1 to about 15, in other embodiments from about 1 to about 12, and in other embodiments from about 3 to about 10 moles of alkoxysilane per mole of polymer to be treated.

In one or more embodiments, the amount of silane including a hydrolyzable group employed may be at least 0.1, in other embodiments at least 0.5, in other embodiments at least 0.8, in other embodiments at least 0.9, and in other embodiments at least 1.0 moles of silane including a hydrolyzable group per mole of polymer to be treated (which is equivalent to, for example, the moles of lithium employed in polymerizing the polymer). In these or other embodiments, the amount of silane including a hydrolyzable group employed may be at most 10, in other embodiments at most 5, in other embodiments at most 2, and in other embodiments at most 1.2 moles of silane including a hydrolyzable group per mole of polymer to be treated. In one or more embodiments, the amount of silane including a hydrolyzable group employed may be from about 0.1 to about 10, in other embodiments from about 0.5 to about 2, and in other embodiments from about 0.9 to about 1.2 moles of silane including a hydrolyzable group per mole of polymer to be treated.

In one or more embodiments, the amount of silane including a hydrolyzable group employed may be represented based upon the equivalents of halide and/or ester functionalities. For example, the equivalents of halide or ester functionality to the moles of polymer (which may be equivalent to the moles of lithium employed to synthesize the polymer); i.e., a ratio of halide-ester/polymer. In one or more embodiments, the ratio of halide-ester/polymer may be at least 0.8:1, in other embodiments at least 0.9:1, and in other embodiments at least 0.95:1. In these or other embodiments, the ratio of halide-ester/polymer may be at most 1.5:1, in other embodiments at most 1.2:1, and in other embodiments at most 1.1:1. In one or more embodiments, the amount of silane including a hydrolyzable group employed may be from about 0.8 to about 1.2, in other embodiments from about 0.9 to about 1.1, and in other embodiments from about 0.95 to about 1.05 equivalents of halide and/or ester per mole of polymer to be treated.

In one or more embodiments, the polymer cement treated according to practice of this invention is substantially devoid of living polymer, which refers to that amount of living polymer of less that will have an appreciable impact on the stabilization and/or neutralization of the polymer or polymer cement. In other words, the polymer cement is substantially non-living. As those skilled in the art appreciate, non-living polymer includes that polymer incapable of adding additional monomer. As discussed above, living polymer is capable of adding additional monomer to its reactive chain end. In one or more embodiments, the polymer cement includes less than 10%, in other embodiments less than 5%, in other embodiments less than 2%, in other embodiments less than 1%, and in other embodiments less than 0.5%, based on the total moles of polymer chain, of living polymer. In particular embodiments, the polymer cement is devoid of living polymer.

In one or more embodiments, the silane including a hydrolyzable group is introduced to the polymer cement following the introduction of the alkoxysilane. In one or more embodiments, the silane including the hydrolyzable group is introduced to the polymer cement immediately after introduction of the alkoxysilane. In other embodiments, the alkoxysilane is allowed to react or interact with the polymers containing a hydrolyzable functionality prior to introduction of the silane including the hydrolyzable group. In one or more embodiments, the amount of time allowed between completion of the addition step to add the alkoxysilane and the beginning of the addition step to add the silane including the hydrolyzable group is at least 0.5 minutes, in other embodiments at least 1 minute, in other embodiments at least 3 minutes, and in other embodiments at least 5 minutes. In these or other embodiments, the time period is at most 3 hours, in other embodiments at most 2 hours, and in other embodiments at most 1 hour.

In one or more embodiments, practice of the present invention includes treatment of the polymer according to the methods of the present invention after functional termination, coupling, and/or quenching of the polymer. For example, in one or more embodiments, a living polymer cement may be partially terminated with functional terminator, partially coupled, and then quenched with a protic compound such as an alcohol. Following this sequence, the alkoxysilane is added to the polymer cement followed by the silane containing a hydrolyzable group to thereby treat the polymer according to practice of the present invention.

In one or more embodiments, the alkoxysilane and silane including a hydrolyzable group are introduced to the polymer while the polymer is dissolved or suspended within a solvent. As those skilled in the art appreciate, this solution may be referred to as a polymer cement. In one or more embodiments, the characteristics of the polymer cement, such as its concentration, will be the same or similar to the characteristics of the cement prior to functionalization and/or quenching. In other embodiments, the alkoxysilane and silane including a hydrolyzable group may be introduced to the polymer while the polymer is suspended or dissolved within monomer.

Polymer Isolation

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer. In one or more embodiments, after formation of the polymer, a processing aid and other optional additives such as oil can be added to the polymer cement. The polymer and other optional ingredients may then be isolated from the solvent and optionally dried. Conventional procedures for desolventization and drying may be employed. In one embodiment, the polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

In one or more embodiments, after the introduction of the functionalizing agent to the reactive polymer, optionally after the addition of a quenching agent and/or antioxidant, and optionally after recovery or isolation of the functionalized polymer, a condensation accelerator can be added to the polymerization mixture. Useful condensation accelerators include tin and/or titanium carboxylates and tin and/or titanium alkoxides. One specific example is titanium 2-ethylhexyl oxide. Useful condensation catalysts and their use are disclosed in U.S. Publication No. 2005/0159554A1, which is incorporated herein by reference.

In one or more embodiments, after the reaction between the reactive polymer and the functionalizing agent has been accomplished or completed, optionally after the addition of a quenching agent and/or condensation catalyst, and optionally after recovery or isolation of the functionalized polymer, further reactions may be carried out with the functionalized polymer. For example, the functionalized polymer product can be treated with an alcohol, optionally in the presence of appropriate catalysts, which is believed to effect the formation of hydrocarbyloxy groups in lieu of hydroxy groups or halogen atoms that may be associated with the functional group of the polymer. In these or other embodiments, the functionalized polymers resulting from practice of the present invention can be exposed to or treated with water, optionally in the presence of a catalyst, in order to cleave or replace any hydrolyzable protecting groups that may be present or associated with the functional group of the polymer. Strong acid catalysts, such as those described herein, may be used for this purpose.

INDUSTRIAL APPLICABILITY

The polymers of this invention are particularly useful in preparing rubber compositions that can be used to manufacture tire components. Rubber compounding techniques and the additives employed therein are generally disclosed in The Compounding and Vulcanization of Rubber, in Rubber Technology ($2^{nd}$ Ed. 1973).

The rubber compositions can be prepared by using the polymers of this invention alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer and silica in the substantial absence of coupling agents and shielding agents.

The rubber compositions prepared from the polymers of this invention are particularly useful for forming tire components such as treads, subtreads, sidewalls, body ply skims, bead filler, and the like. In one or more embodiments, these tread or sidewall formulations may include from about 10% to about 100% by weight, in other embodiments from about 35% to about 90% by weight, and in other embodiments from about 50% to about 80% by weight of the polymer of this invention based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

In order to demonstrate the practice of the present invention, the following examples have been prepared and tested. The examples should not, however, be viewed as limiting the scope of the invention. The claims will serve to define the invention.

EXAMPLES

Samples 1-9

For each of the samples, living polymer cement was prepared by charging a 38 L reactor with 9.5 kg of technical hexanes, 5.8 kg of a 31% solution of styrene/hexane blend, and 16.6 kg of a 21.8% 1,3-butadiene/hexane blend. A solution of n-butyllithium in hexanes (99 g, 0.47 M solution) was charged next, followed by potassium t-amylate in cyclohexane (3.6 mL, 1.3 M solution) and 2,2-bis(2'-tetra hydrofuryl)propane polar randomizer (1.5 mL, neat) in 50 mL of hexane. The reactor was heated in jacket mode to 57° C. The reaction exothermed to 87° C. within 25 minutes of the polymerization start time. Samples of the base polymer were removed from the reactor about 40 minutes after start time and were partially terminated with N-(1,3-dimethylbutylidene)-3-(triethoxysilyl)-1-propaneamine (7 mL, neat) in 50 mL of hexanes, 45 minutes after the polymerization start time. After mixing for 30 minutes, termination was completed by charging octyltriethoxysilane (OTES) (2.7 mL, neat) in 50 mL of hexanes. After mixing for 10 minutes, the terminated polymer cement was transferred to a blend tank and optionally treated as will be described herein below. Following treatment, butylated hydroxytoluene (50 g, neat) dissolved in 100 g of hexanes was added and the polymer was isolated by steam desolventization and oven drying.

Within the blend tank, Sample 1 was treated with 1 equivalent of octyltriethoxysilane per equivalent of lithium.

Within the blend tank, Sample 2 was treated with 7 equivalents of octyltriethoxysilane per equivalent of lithium.

Within the blend tank, Sample 3 was treated with 1 equivalent of octyltriethoxysilane per equivalent of lithium, and then after about 10 minutes of additional mixing, the polymer was subsequently treated with 1 equivalent of dimethyldichlorosilane (($CH_3$)$_2$$SiCl_2$) per equivalent of lithium.

Within the blend tank, Sample 4 was treated with 7 equivalents of octyltriethoxysilane per equivalent of lithium, followed by treatment of 1 equivalent of dimethyldichlorosilane per equivalent of lithium.

Samples 5 and 6 were initially treated with 0.9 equivalent of silicon tetrachloride ($SiCl_4$) per equivalent of lithium, and then after about 10 minutes of additional mixing, were subsequently treated with 1 equivalent of octyltriethoxysilane per equivalent of lithium.

Sample 7 was initially treated with 0.9 equivalent of methyltrichlorosilane ($CH_3SiCl_3$) per equivalent of lithium, and then after about 10 minutes of additional mixing, was subsequently treated with 1 equivalent of octyltriethoxysilane per equivalent of lithium.

Samples 8 and 9 were initially treated with 0.9 equivalent of dimethyldichlorosilane per equivalent of lithium, and then after about 10 minutes of additional mixing, was subsequently treated with 1 equivalent of octyltriethoxysilane per equivalent of lithium.

The particulars of samples 1-9 are set forth in Table I including the peak molecular weight (Mp) of the base polymer, the percent coupling (% cplg), percent styrene within the copolymer (% styrene), the Mooney viscosity at 100° C. for aged and unaged samples, and the change in Mooney viscosity between the aged and unaged samples.

TABLE I

| | Sample | | | | | | | | |
|---|---|---|---|---|---|---|---|---|---|
| | 1 | 2 | 3 | 4 | 5 | 6 | 7 | 8 | 9 |
| Additive 1 | OTES | OTES | OTES | OTES | $SiCl_4$ | $SiCl_4$ | $CH_3SiCl_3$ | $(CH_3)_2SiCl_2$ | $(CH_3)_2SiCl_2$ |
| Ratio to Li | 1 eq/Li | 7 eq/Li | 1 eq/Li | 7 eq/Li | 0.9 eq Cl/Li | 0.9 eq Cl/Li | 0.9 eq Cl/Li | 0.9 eq Cl/Li | 0.9 eq Cl/Li |
| Additive 2 | — | — | $(CH_3)_2SiCl_2$ | $(CH_3)_2SiCl_2$ | OTES | OTES | OTES | OTES | OTES |
| Ratio to Li | — | — | 1 eq Cl/Li | 1 eq Cl/Li | 1 eq/Li | 1 eq/Li | 1 eq/Li | 1 eq/Li | 1 eq/Li |
| Mp (kg/mole) | 110 | 110 | 111 | 111 | 95 | 110 | 101 | 106 | 94 |
| % cplg | 35 | 39 | 42 | 42 | 30.5 | 26 | 34 | 32 | 31.7 |
| % styrene | 36 | 36 | 36 | 36 | 36 | 36 | 35 | 35 | 36 |
| $ML_{(1+4)}$@ 100° C. Unaged | 62.6 | 66 | 59.3 | 62.3 | 63.1 | 112.9 | 83.1 | 97 | 69.6 |
| $ML_{(1+4)}$@ 100° C. Aged | 122.7 | 98 | 77.1 | 78.5 | 115.7 | 133.2 | 106 | 101.3 | 86.1 |
| Δ ML | 60.1 | 32 | 17.8 | 16.2 | 52.6 | 20.3 | 22.9 | 4.3 | 16.5 |

The Mp of the sample was determined using GPC analysis with universal calibration. The Mp represent the peak average molecular weight. The degree of coupling was determined from the area of the peak in question as a function of the overall area under the curve using standard GPC analysis. The percent styrene was determined by using proton NMR.

The Mooney viscosity $ML_{(1+4)}$@100° C. was determined by using an Alpha Technologies Mooney viscometer with a large rotor, a one-minute warm-up time, and a four-minute running time. The samples were aged at 100° C. and ambient humidity for 2 days. The change in Mooney viscosity between the unaged and aged sample is recorded as Δ ML.

As shown in Table I, particularly samples 3 and 4, which represent practice of the present invention, the addition of the dimethyldichlorosilane had significant impact on the aged Mooney properties over samples 1 and 2, wherein dimethyldichlorosilane was not employed. Also, as shown in samples 5-9, the order of addition of the stabilizing agents has significant impact on the results achieved. For example, the unaged Mooney values of samples 5-9 are generally much higher than where octyltriethoxysilane was first introduced (i.e., compared to samples 3 and 4). Where the unaged Mooney was comparable, such as Sample 5, the aged Mooney was significantly higher.

Samples 10-13

Using polymerization procedures similar to the techniques described for Samples 1-9, styrene-butadiene copolymer was prepared and partially functionalized with N-(1, 3-dimethylbutylidene)-3-(triethoxysilane)-1-propaneamine, and then the functionalization of the polymer was completed with octyltriethoxysilane. As with samples 1-9, the polymer cement was mixed for an additional 10 minutes and then transferred to a blend tank. Following treatment within the blend tank, the polymer cement was treated with butylated hydroxytoluene and then isolated by steam desolventization and oven-drying.

Within the blend tank, Sample 10 was treated with 1 equivalent of diphenyldimethoxysilane per equivalent of lithium.

Sample 11 was treated with 3 equivalents of diphenyldimethoxysilane per equivalent of lithium.

Sample 12 was first treated with 1 equivalent of diphenyldimethoxysilane per equivalent of lithium, and after about 10 minutes of mixing, was subsequently treated with 1 equivalent of dimethyldichlorosilane per equivalent of lithium.

Sample 13 was treated with 1 equivalent of diphenyldimethoxysilane per equivalent of lithium, and after about 10 minutes of mixing was treated with 3 equivalents of dimethyldichlorosilane per equivalent of lithium.

The particulars of samples 10-13 are set forth in Table II including the peak molecular weight (Mp) of the base polymer, the percent coupling (% cplg), percent styrene within the copolymer (% styrene), the Mooney viscosity at 100° C. for aged and unaged samples, and the change in Mooney viscosity between the aged and unaged samples.

TABLE II

|  | Sample | | | |
| --- | --- | --- | --- | --- |
|  | 10 | 11 | 12 | 13 |
| Additive 1 | DPDMS | DPDMS | DPDMS | DPDMS |
| Ratio to Li | 1 eq/Li | 3 eq/Li | 1 eq Cl/Li | 1 eq Cl/Li |
| Additive 2 | — | — | $(CH_3)_2SiCl_2$ | $(CH_3)_2SiCl_2$ |
| Ratio to Li | — | — | 1 eq/Li | 3 eq/Li |
| Mp (kg/mole) | 121 | 120 | 120 | 119 |
| % cplg | 33.6 | 33.7 | 31.3 | 32.6 |
| % styrene | 36 | 36 | 35.9 | 35.9 |
| $ML_{(1+4)}$@ 100° C. Unaged | 59 | 52.2 | 57.5 | 54 |
| $ML_{(1+4)}$@ 100° C. Aged | 78 | 63.4 | 67 | 46.5 |
| Δ ML | 19 | 11.2 | 9.5 | −7.5 |

As shown in Table II, the addition of the diethyldichlorosilane in samples 12 and 13 had significant impact on the change in Mooney viscosity between the aged and unaged samples.

Samples 14-19

Using polymerization procedures similar to the techniques described for Samples 1-9, styrene-butadiene copolymer was prepared and partially functionalized with N-(1, 3-dimethylbutylidene)-3-(triethoxysilane)-1-propaneamine and then the functionalization of the polymer was completed with octyltriethoxysilane. As with samples 1-9, the polymer cement was mixed for an additional 10 minutes and then transferred to a blend tank. Following treatment within the blend tank, the polymer cement was treated with butylated hydroxytoluene and then isolated by directly drying the polymer after coagulation in isopropyl alcohol.

Sample 14 was treated with 1 equivalent of octyltriethoxysilane per equivalent of lithium.

Sample 15 was first treated with 1 equivalent of octyltriethoxysilane per equivalent of lithium, and after about 10 minutes of mixing, was subsequently treated with 1 equivalent of silicon tetrachloride per equivalent of lithium.

Sample 16 was initially treated with 0.8 equivalent of octyldimethylchlorosilane per equivalent of lithium, and after about 10 minutes of mixing was subsequently treated with 1 equivalent of octyltriethoxysilane per equivalent of lithium.

Sample 17 was treated with 1 equivalent of octyldimethylchlorosilane per equivalent of lithium, and after about 10 minutes of mixing was treated with 1 equivalent of octyltriethoxysilane per equivalent of lithium.

Sample 18 was initially treated with 1 equivalent of propyldimethylchlorosilane per equivalent of lithium, and after about 10 minutes of mixing was subsequently treated with 1 equivalent of octyltriethoxysilane per equivalent of lithium.

Sample 19 was treated with 1.2 equivalent of propyldimethylchlorosilane per equivalent of lithium, and after about 10 minutes of mixing was treated with 1 equivalent of octyltriethoxysilane per equivalent of lithium.

The particulars of samples 14-19 are set forth in Table III including the peak molecular weight (Mp) of the base polymer, the percent coupling (% cplg), percent styrene within the copolymer (% styrene), the Mooney viscosity at 100° C. for aged and unaged samples, and the change in Mooney viscosity between the aged and unaged samples.

TABLE III

| | Sample | | | | | |
|---|---|---|---|---|---|---|
| | 14 | 15 | 16 | 17 | 18 | 19 |
| Additive 1 | OTES | OTES | Oct(CH$_3$)$_2$SiCl | Oct(CH$_3$)$_2$SiCl | Propyl(CH$_3$)$_2$SiCl | Propyl(CH$_3$)$_2$SiCl |
| Ratio to Li | 1 eq/Li | 1 eq/Li | 0.8 eq Cl/Li | 1 eq Cl/Li | 1 eq Cl/Li | 1.2 eq Cl/Li |
| Additive 2 | — | SiCl$_4$ | OTES | OTES | OTES | OTES |
| Ratio to Li | — | 1 eq Cl/Li | 1 eq/Li | 1 eq/Li | 1 eq/Li | 1 eq/Li |
| Mp (kg/mole) | 99 | 99 | 130 | 130 | 136 | 137 |
| % cplg | 14.3 | — | 28.7 | 19.2 | 13.8 | 15.8 |
| % styrene | 20 | 20 | 20 | 20 | 20 | 20 |
| ML$_{(1+4)}$@ 100° C. Unaged | 12.7 | 17 | 25 | 31.3 | 32.5 | 41.1 |
| ML$_{(1+4)}$@ 100° C. Aged | 40.4 | 37.9 | 59.9 | 56.3 | 56.2 | 59.4 |
| Δ ML | 27.7 | 20.9 | 34.9 | 25 | 23.7 | 18.3 |

As shown in Table III, the unaged Mooney values of polymer samples isolated and dried by direct drying (as compared to steam desolventization) were, as would be expected, lower than in the previous samples. The impact of practicing the present invention, however, is still observed. For example, Sample 15 shows the reduction in Mooney viscosity change between aged and unaged samples when silicon tetrachloride is added following octyltriethyoxysilane. Likewise, samples 16-19 show the significance in the order of addition. Indeed, where the chlorosilane compounds were added prior to the octyltriethoxysilane, the unaged Mooney values were higher than Sample 15, the latter representing practice of the present invention.

Various modifications and alterations that do not depart from the scope and spirit of this invention will become apparent to those skilled in the art. This invention is not to be duly limited to the illustrative embodiments set forth herein.

What is claimed is:

1. A process for treating a polymer having a hydrolyzable functionality, the process comprising:
   (i) providing a polymer having hydrolyzable functionality;
   (ii) introducing a hydrocarbyl trihydrocarbyloxy silane to the polymer; and
   (iii) introducing a silane having a hydrolyzable functionality after said step of introducing the hydrocarbyl trihydrocarbyloxy silane, where the silane having a hydrolyzable functionality is defined by the formula II

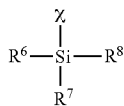

where χ is a halogen atom, and where R$^6$, R$^7$, and R$^8$ are each independently a halogen atom, a hydrocarbyl group, a hydrocarboxylate group, or a hydrocarbyloxy group.

2. The process of claim 1, where R$^6$ is a halogen atom and R$^7$ and R$^8$ are each independently hydrocarbyl groups.

3. The process of claim 1, where R$^6$ and R$^7$ are each independently halogen atoms and R$^8$ is a hydrocarbyl group.

4. The process of claim 1, where R$^6$, R$^7$, and R$^8$ are each halogen atoms.

5. The process of claim 1, where the amount of hydrocarbyl trihydrocarbyloxy silane introduced to the polymer is at least 0.1 and at most 15 moles of hydrocarbyl trihydrocarbyloxy silane per mole of polymer treated.

6. The process of claim 1, where the amount of hydrocarbyl trihydrocarbyloxy silane introduced to the polymer is at least 1 and at most 12 moles of hydrocarbyl trihydrocarbyloxy silane per mole of polymer treated.

7. The process of claim 1, where the amount of silane having a hydrolyzable functionality introduced to the polymer is at least 0.1 and at most 10 moles of silane per mole of polymer treated.

8. The process of claim 1, where the amount of silane having a hydrolyzable functionality introduced to the polymer is at least 0.5 and at most 5 moles of silane per mole of polymer treated.

9. The process of claim 1, where said step of introducing the hydrocarbyl trihydrocarbyloxy silane to the polymer takes place within a solvent, the process further comprising the step of isolating the treated polymer from the solvent.

10. A tire, including at least one component that includes the vulcanized product of the treated polymer of claim 9.

11. The process of claim 1, where the polymer having a hydrolyzable functionality is substantially non-living.

12. The process of claim 1, wherein the hydrocarbyl trihydrocarbyloxy silane is selected from the group consisting of methyltrimethoxysilane, ethyltrimethoxysilane, propyltrimethoxysilane, phenyltrimethoxysilane, octyltrimethoxysilane, decyltrimethoxysilane, methyltriethoxysilane, ethyltriethoxysilane, propyltriethoxysilane, phenyltriethoxysilane, octyltriethoxysilane, decyltriethoxysilane, methyltriphenoxysilane, ethyltriphenoxysilane, propyltriphenoxysilane, octyltriphenoxysilane, phenyltriphenoxysilane, decyltriphenoxysilane, methyldiethoxymethoxysilane, ethyldiethoxymethoxysilane, propyldiethoxymethoxysilane, phenyldiethoxymethoxysilane, octyldiethoxymethoxysilane, decyldiethoxymethoxysilane, methyldiphenoxymethoxysilane, ethyldiphenoxymethoxysilane, propyldiphenoxymethoxysilane, phenyldiphenoxymethoxysilane, octyldiphenoxymethoxysilane, decyldiphenoxymethoxysilane, methyldimethoxyethoxysilane, ethyldimethoxyethoxysilane, propyldimethoxyethoxysilane, phenyldimethoxyethoxysilane, octyldimethoxyethoxysilane, decyldimethoxyethoxysilane, methyldiphenoxyethoxysilane, ethyldiphenoxyethoxysilane, propyldiphenoxyethoxysilane, phenyldiphenoxyethoxysilane, octyldiphenoxyethoxysilane, decyldiphenoxyethoxysilane, methyldimethoxyphenoxysilane, ethyldimethoxyphenoxysilane, propyldimethoxyphenoxysilane, phenyldimethoxyphenoxysilane, octyldimethoxyphenoxysilane, decyldimethoxyphenoxysilane, methyldiethoxyphenoxysilane, ethyldiethoxyphenoxysilane, propyldiethoxyphenoxysilane, phenyldiethoxyphenoxysilane, octyldiethoxyphenoxysilane, decyldiethoxyphenoxysilane, methylmethoxyethoxyphenoxysilane, ethylmethoxyethoxyphenoxysilane, propylmethoxyethoxyphenoxysilane, phenylmethoxyethoxyphenoxysilane, octylmethoxyethoxyphenoxysilane, and decylmethoxyethoxyphenoxysilane.

13. The process of claim 1, wherein the hydrocarbyl trihydrocarbyloxy silane is octyltriethoxysilane.

14. The process of claim 1, wherein the silane having a hydrolyzable functionality is dimethyl silyl dichloride.

15. A process for treating a polymer having a hydrolyzable functionality, the process comprising:
 (i) providing a polymer having hydrolyzable functionality;
 (ii) introducing a hydrocarbyl trihydrocarbyloxy silane to the polymer; and
 (iii) introducing a silane having a hydrolyzable functionality after said step of introducing the hydrocarbyl trihydrocarbyloxy silane, where the silane having a hydrolyzable functionality is a silyl halide selected from the group consisting of trihydrocarbyl silyl halides, (dihydrocarbyl) (hydrocarbyloxy) silyl halides, (hydrocarbyl) (dihydrocarbyloxy) silyl halides, trihydrocarbyloxy silyl halides, dihydrocarbyl silyl dihalides, (hydrocarbyl) (hydrocarbyloxy) silyl dihalides, hydrocarbyl silyl trihalides, hydrocarbyloxy silyl trihalides, and silyl tetrahalides.

16. The process of claim 15, wherein the silyl halide is a dihydrocarbyl silyl dihalide.

17. The process of claim 15, wherein the hydrocarbyl trihydrocarbyloxy silane is octyltriethoxysilane and the silyl halide is dimethyl silyl dichloride.

* * * * *